(12) United States Patent
Corry et al.

(10) Patent No.: US 9,481,838 B2
(45) Date of Patent: Nov. 1, 2016

(54) CAPTURE AND STORAGE OF EMISSIONS FROM A GASIFIER

(75) Inventors: Judeth Brannon Corry, Manvel, TX (US); Raul Eduardo Ayala, Houston, TX (US); Tiffany Elizabeth Pinard Westendorf, Troy, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 739 days.

(21) Appl. No.: 13/526,370

(22) Filed: Jun. 18, 2012

(65) Prior Publication Data

US 2013/0334463 A1 Dec. 19, 2013

(51) Int. Cl.
| G01N 35/08 | (2006.01) |
| C10J 3/72 | (2006.01) |
| C10J 3/82 | (2006.01) |
| C10J 3/84 | (2006.01) |
| C10K 1/00 | (2006.01) |
| C10K 1/10 | (2006.01) |

(52) U.S. Cl.
CPC ......... *C10J 3/726* (2013.01); *C10J 3/82* (2013.01); *C10J 3/84* (2013.01); *C10K 1/003* (2013.01); *C10K 1/10* (2013.01); *C10J 3/721* (2013.01); *C10J 2300/1693* (2013.01); *C10J 2300/1823* (2013.01); *Y02E 20/16* (2013.01); *Y02E 20/18* (2013.01)

(58) Field of Classification Search
None
See application file for complete search history.

(56) References Cited

U.S. PATENT DOCUMENTS

| 5,581,574 | A | 12/1996 | Vice |
| 5,630,854 | A | 5/1997 | Sealock, Jr. et al. |
| 7,060,944 | B2 | 6/2006 | Ose |
| 2001/0049080 | A1 | 12/2001 | Asano et al. |
| 2002/0162332 | A1 | 11/2002 | Hazlebeck |
| 2005/0106524 | A1 | 5/2005 | Ose |
| 2009/0202403 | A1* | 8/2009 | Jimenez-Huyke et al. .. 422/198 |
| 2011/0119998 | A1 | 5/2011 | Herrington |
| 2011/0277385 | A1* | 11/2011 | Mazumdar et al. ............ 48/77 |
| 2012/0027663 | A1 | 2/2012 | Pinard Westendorf et al. |
| 2012/0027664 | A1 | 2/2012 | Pinard Westendorf et al. |

FOREIGN PATENT DOCUMENTS

| CN | 2433258 Y | 6/2001 |
| CN | 101825016 A | 9/2010 |
| CN | 102449124 A | 5/2012 |
| DE | 68910817 | 3/1994 |
| EP | 0404828 | 11/1993 |

(Continued)

OTHER PUBLICATIONS

U.S. Appl. No. 13/336,569, filed Feb. 6, 2012, Raul Eduardo Ayala.
(Continued)

*Primary Examiner* — Robert Xu
(74) *Attorney, Agent, or Firm* — Fletcher Yoder, P.C.

(57) ABSTRACT

A system includes a capture system, a storage system, and a return system. The capture system is configured to receive an outlet gas from a gasification system and to extract a component gas of the outlet gas using a regenerable material during a start-up operation of the gasification system. The storage system is coupled to the capture system and is configured to store the component gas extracted by the capture system. The return system is configured to return the component gas from the storage system to the gasification system during a normal operation of the gasification system.

7 Claims, 5 Drawing Sheets

(56) References Cited

FOREIGN PATENT DOCUMENTS

| EP | 1160836 | | 12/2007 | |
|----|---------|---|---------|---|
| EP | WO 2010/136425 | * | 12/2010 | ............... C10K 1/08 |
| JP | 10087333 | | 4/1998 | |

OTHER PUBLICATIONS

CN Opinion Notice for First Examination and English Translation; Application No. CN 201310240878.8; Dated Jul. 4, 2016; 13 pages.

* cited by examiner

CAPTURE AND STORAGE OF EMISSIONS FROM A GASIFIER

BACKGROUND OF THE INVENTION

The subject matter disclosed herein relates to gasification systems, and more specifically, to systems and methods to decrease emissions of the gasification systems.

Gasification systems generate synthesis gas (syngas) that can be used for a variety of purposes, such as power production or chemical synthesis. For example, integrated gasification combined cycle (IGCC) power plants may generate electricity from various carbonaceous feed stocks, such as coal or natural gas. The generation of syngas often produces additional byproducts, such as carbon dioxide ($CO_2$), chlorides, and sulfides. Thus, it may be desirable to treat the syngas by removing a portion of these byproducts. Gasification systems may employ a variety of treatment processes, such as scrubbers and sequestration processes, to reduce the amount of byproducts and subsequent emissions from the gasification systems. Unfortunately, these treatment processes may not be fully operational during start-up of the gasification systems, which reduces the efficiency of the gasification systems and increases emissions.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a capture system, a storage system, and a return system. The capture system is configured to receive an outlet gas from a gasification system and to extract a component gas of the outlet gas using a regenerable material during a start-up operation of the gasification system. The storage system is coupled to the capture system and is configured to store the component gas extracted by the capture system. The return system is configured to return the component gas from the storage system to the gasification system during a normal operation of the gasification system.

In a second embodiment, a system includes a first gasification train and a storage train. The first gasification train is configured to generate and treat syngas during a normal operation and to generate combustion products during a start-up operation. The storage train is coupled to the first gasification train. In addition, the storage train includes a capture system, a storage system, and a return system. The capture system is coupled to the first gasification train and is configured to receive the combustion products or the syngas from the first gasification train and to extract a component gas from the combustion products or the syngas. The storage system is coupled to the capture system and is configured to store the component gas from the capture system. The return system is coupled to the storage system and the first gasification train and is configured to return the component gas to the first gasification train.

In a third embodiment, a method includes detecting an operating condition of a gasifier of a gasification train using a sensor. The method also includes determining if the gasifier is operating in a start-up mode or a normal mode based on the operating condition using a controller. When the gasifier is operating in the start-up mode, the method includes capturing gas from the gasifier, extracting a component of the gas using a capture system, and storing the component of the gas in a storage system. When the gasifier is operating in the normal mode, the method includes returning the component of the gas to the gasification train using a return system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for reducing emissions of a gasification system during start-up. In particular, a storage train may capture and store the emissions (e.g., carbon dioxide, chlorides, or sulfides) during start-up of a gasification train. Gasification trains may typically include treatment systems to reduce emissions, but these treatment systems may not be efficient or operable during start-up. Once the gasification train has completed the start-up sequence, the storage train returns the stored emissions to the gasification train for processing by the now-operational treatment systems. Emissions that may otherwise be released to the atmosphere during start-up are used in downstream systems after start-up, thereby reducing emissions of the gasification system.

Figure 1:
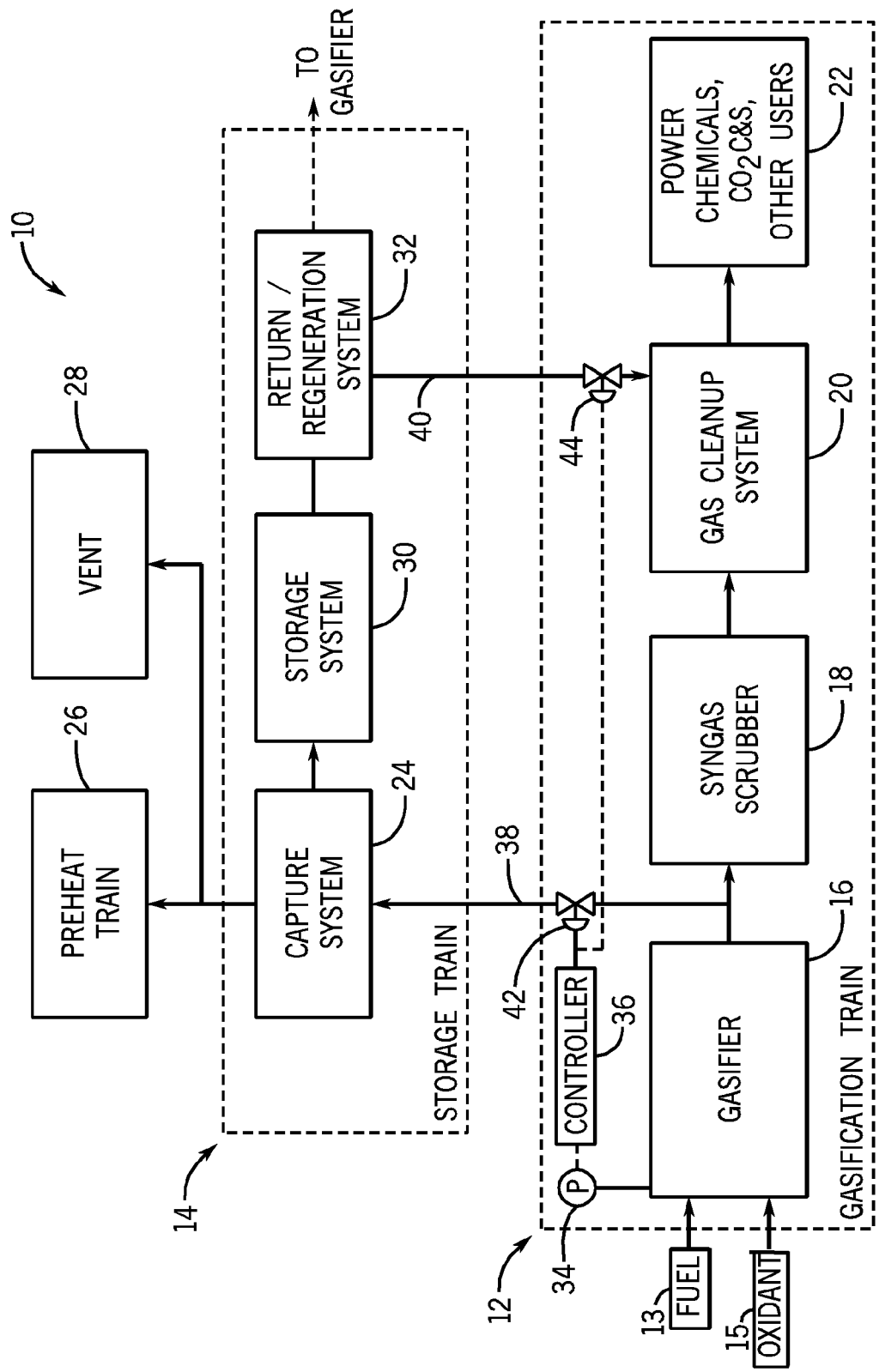
FIG. 1 is a schematic diagram of an embodiment of a gasification system including a storage train having a capture system, a storage system, and a return system.

Turning now to the figures, FIG. 1 illustrates an embodiment of a gasification system 10 that includes a gasification train 12 and a storage train 14. The gasification train 12 receives a fuel 13 and an oxidant 15 and reacts the fuel 13 and the oxidant 15 within a gasifier 16 to form reaction products. The type of reaction products formed may depend on an operating mode of the gasification train 12. For example, when the gasification train 12 is operating in a start-up mode, the gasifier 16 may combust the fuel 13 and the oxidant 15 into combustion products. In addition, start-up mode may be generally defined by lower than design or transient operating conditions (e.g., flow rate, level, concentration, temperature, or pressure). The combustion reaction during start-up mode provides heat that can be used to preheat downstream components of the gasification train 12. When the gasification train 12 is operating in a normal mode, the gasifier 16 may react the fuel 13 and the oxidant 15 to form syngas, for purposes such as power generation or chemical synthesis. Normal mode may be generally defined by steady-state operating conditions, or operation at design conditions.

During normal operation, untreated syngas flows from the gasifier 16 to a syngas scrubber 18. The syngas scrubber 18 reduces the amount of impurities (e.g., particulates and chlorides) contained in the syngas, using, for example, a water quench. The scrubbed syngas then flows to a gas treatment system 20, where sulfides, carbon dioxide, and/or other impurities are removed from the syngas. The gas treatment system 20 may employ a variety of methods to remove these impurities. These removal methods may include chemical or physical absorption, adsorption, cryogenics, membranes, ceramics, microbial or algal systems, or any combination thereof. In certain embodiments, the gas treatment system 20 may include an acid gas removal (AGR) unit, and/or a carbon capture unit. Treated syngas exits the gas treatment system 20 and flows towards downstream users 22 of syngas. In certain embodiments, the downstream users 22 may include an integrated gasification combined cycle (IGCC) power plant to produce power, a chemical plant to produce methanol, or other users. The downstream users 22 may also include carbon dioxide capture and sequestration ($CO_2$ C&S) systems to reduce emissions of the gasification train 12.

Unfortunately, during start-up operation of the gasification train, the syngas scrubber 18 and the gas treatment system 20 may be inefficient or inoperable. In addition, the combustion products produced by the gasifier 16 during start-up operation may be less suitable for the downstream users 22 than the syngas produced during normal operation. Accordingly, the storage train 14 may capture a portion of the combustion products during start-up operation using a capture system 24. For example, the capture system 24 may receive an outlet gas from the gasifier 16 and extract a component gas from the outlet gas. The remaining gas may then be sent to a preheat train 26 to heat various components of the gasification system 10. For example, the preheat train 26 may preheat the IGCC system, e.g., by providing heat to generate steam in a heat recovery steam generator (HRSG), or for other preheating. Additionally or alternatively, the remaining gas may be sent to a vent 28, where the remaining gas is released to the atmosphere in accordance with federal, state, and municipal regulations. The outlet gas received by the capture system 24 may be combustion products or syngas, depending on the mode of operation of the gasification train 12. In addition, the extracted component gas may be carbon dioxide ($CO_2$), hydrogen sulfide ($H_2S$), nitrogen oxide ($NO_x$), sulfur oxide ($SO_x$), another combustion product or byproduct, or any combination thereof. Thus, certain embodiments of the capture system 24 may extract one or more component gases. The component gas may be extracted using a regenerable material, such as an absorbent, a solvent, or a membrane, which may be more efficient than other methods of extracting the component gas. Thus, in certain embodiments, the component gas may be extracted using an absorber, a solvent, or another suitable method or material, as will be described further below in FIGS. 2 and 3.

From the capture system 24, the extracted component gas flows to a storage system 30, which stores the component gas during the start-up of the gasification train 12. The storage system 30 may employ a plurality of storage tanks or other pressure vessels to store the extracted component gas. In certain embodiments, the extracted component may be stored in a vapor, liquid, or solid form. Indeed, the phase of the extracted component may depend on the extraction method of the capture system 24. Accordingly, the storage system 30 may include various components such as control valves, heat exchangers, solids concentrators, and other equipment to facilitate storage of the extracted component as a vapor, liquid, or a solid. Thus, the storage system 30 may vary among embodiments based on the phase of the extracted component and the extraction method. In the presently contemplated embodiment, the storage system 30 may hold the extracted component until the gasification train 12 is in normal operation.

Once the gasification train 12 is in normal operation, the extracted component may be directed to a return system 32. The return system 32 evolves the extracted component into a vapor phase, by, for example, applying heat or reducing pressure. However, in certain embodiments, the extracted component may remain in a vapor phase throughout the capture system 24 and the storage system 30. Thus, the return system 32 may not involve phase changes of the extracted component. In addition, it may be desirable to maintain the extracted component in a gaseous, liquid, or solid phase. As illustrated, the return system 32 routes the extracted component gas back to the gasification train 12. The extracted component gas may be returned to various locations of the gasification train 12, such as the gasifier 16, the gas treatment system 20, or both. As discussed previously, the gas treatment system 20 may sequester the extracted component gas, thereby decreasing the emissions of the gasification train 10. In certain embodiments, the return system 32 may also regenerate the regenerable material used by the capture system 24. For example, an absorbent may absorb $CO_2$ in the capture system 24. Applying heat to the absorbent in the return system 32 may evolve gaseous $CO_2$ and regenerate the absorbent for further use in the capture system 24. Thus, the return system 32 may also return the regenerated absorbent to the capture system 24. Regeneration of the absorbent in the return system 32 may reduce the amount of regenerable material used, thereby increasing the efficiency of the storage train 14.

The gasification system 10 may include components for monitoring operating conditions and controlling the operation of the storage train 14. As illustrated, the gasification train 12 includes one or more sensors 34 coupled to the gasifier 16. The sensors 34 may detect one or more operating conditions related to the gasifier 16. In certain embodiments, the operating condition may be a temperature, a pressure, a flow rate, a level of fluid within the gasifier 16, a gas concentration, or any combination thereof. Accordingly, the sensors 34 may include a temperature sensor, a pressure sensor, a flow sensor, a level sensor, a gas analyzer, or any combination thereof. After detecting the operating condition, each sensor 34 may transmit each operating condition to a controller 36. The controller 36 may use the operating condition to determine whether the gasification train 12 is operating in the start-up mode or the normal mode. For example, the sensor 34 may detect a pressure. If the detected pressure is lower than a threshold pressure, the detected pressure may be indicative of the start-up mode. Conversely, if the detected pressure is greater than the threshold pressure, the detected pressure may be indicative of the normal mode. In certain embodiments, the sensor 34 may detect multiple types of operating conditions (e.g., temperature and pressure), and the controller may selectively use the operating conditions to determine the operating mode of the gasification train 12.

Additionally or alternatively, the detected pressure may be transient (e.g., changing substantially over a time period) or steady-state (e.g., approximately constant over a time period or varying slightly due to random variation of environmental variables). Thus, a transient state may be indicative of the start-up mode, while a steady-state may be indicative of the normal mode. For example, start-up of the gasification train 12 may occur over a period of time (e.g., 12 hours). The controller 36 may determine that the detected pressure is transient for the 24 hour period and that the detected pressure is steady-state thereafter. In certain embodiments, the controller 36 may calculate a variance of the detected pressure over a time period (e.g., 15 minutes). If the variance is above a threshold, the controller 36 may determine that the pressure is transient, and subsequently, that the gasification train 12 is in the start-up mode. However, if the variance is below the threshold, the controller 36 may determine that the pressure is steady-state and that the gasification train 12 is in the normal mode. The aforementioned methods for determining start-up operation and normal operation are given by way of example only, and are not intended to be limiting. Indeed, other methods may be envisioned, such as by using operator input.

As discussed previously, the operation of the storage train 14 may be based on the operation of the gasification train 12. When the gasification train 12 is in the start-up mode, the storage train 14 captures and stores an extracted gas from the gasification train 12. Once the gasification train 12 is in the normal mode, the storage train 14 returns the extracted gas to the gasification train 12. As shown, piping conduits 38 and 40 couple the gasification train 12 to the storage train 14. In particular, the piping conduit 38 couples the gasifier 16 to the capture system 24. Similarly, the piping conduit 40 couples the return system 32 to the gas treatment system 20. The piping conduit 38, and subsequently the capture system 24, are disposed directly downstream of the gasifier 16 and directly upstream of the syngas scrubber 18.

The gasification system 10 also includes control valves 42 and 44, which are disposed in the piping conduits 38 and 40, respectively. As illustrated, the control valve 42 may enable or block flow from the gasifier 16 to the capture system 24. The control valve 44 may enable or block flow from the return system 32 to the gas treatment system 20. During start-up operation of the gasification train 12, the controller 36 may selectively open the control valve 42 and close the control valve 44. The open control valve 42 may enable outlet gas from the gasifier 16 to flow to the capture system 24, whereas the closed control valve 44 may block extracted gas from returning to the gas treatment system 20. During normal operation of the gasification train 12, the controller 36 may selectively close the control valve 42 and open the control valve 44. The closed control valve 42 may block outlet gas from the gasifier 16 from flowing to the capture system 24, while the open control valve 44 may enable extracted gas to return to the gas treatment system 20. In certain embodiments, the control logic of the controller 36 may vary. For example, during a process upset, it may be desirable to operate the capture system 24, thereby reducing emissions of the gasifier 16 during the process upset. Embodiments of the capture system 24 are discussed further below with respect to FIGS. 2 and 3.

Figure 2:
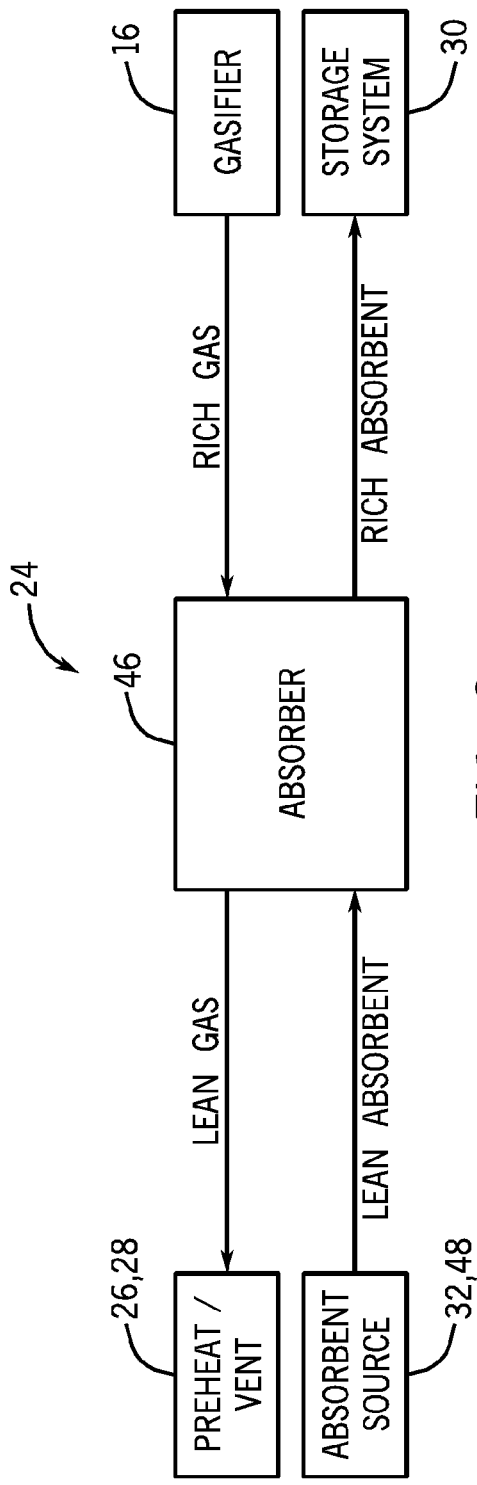
FIG. 2 is a schematic diagram of an embodiment of the capture system of FIG. 1 illustrating an absorber system to capture the emissions.

FIG. 2 illustrates an embodiment of the capture system 24 to extract component gases from the outlet gas of the gasifier 16. As used herein, the terms "rich" and "lean" may generally refer to the concentration of the component to be extracted, wherein a rich stream contains a higher concentration of the component than a lean stream. Thus, as illustrated, the capture system 24 includes an absorber 46 that receives component rich gas from the gasifier 16 and component lean absorbent from an absorbent source 48. The absorbent may be, for example, an aqueous monoethanolamine (MEA) or sodium hydroxide. In certain embodiments, the return system 32 may provide the absorbent to the absorbent source 48. The component rich gas and the component lean absorbent flow counter-currently within the absorber 46, thereby resulting in the absorbent extracting the component gas from the component rich gas. Component lean gas exits the absorber 46 and flows to the preheat train 26 or the vent 28. Component rich absorbent flows to the storage system 30, where the component rich absorbent is stored, in accordance with the techniques described above.

Figure 3:
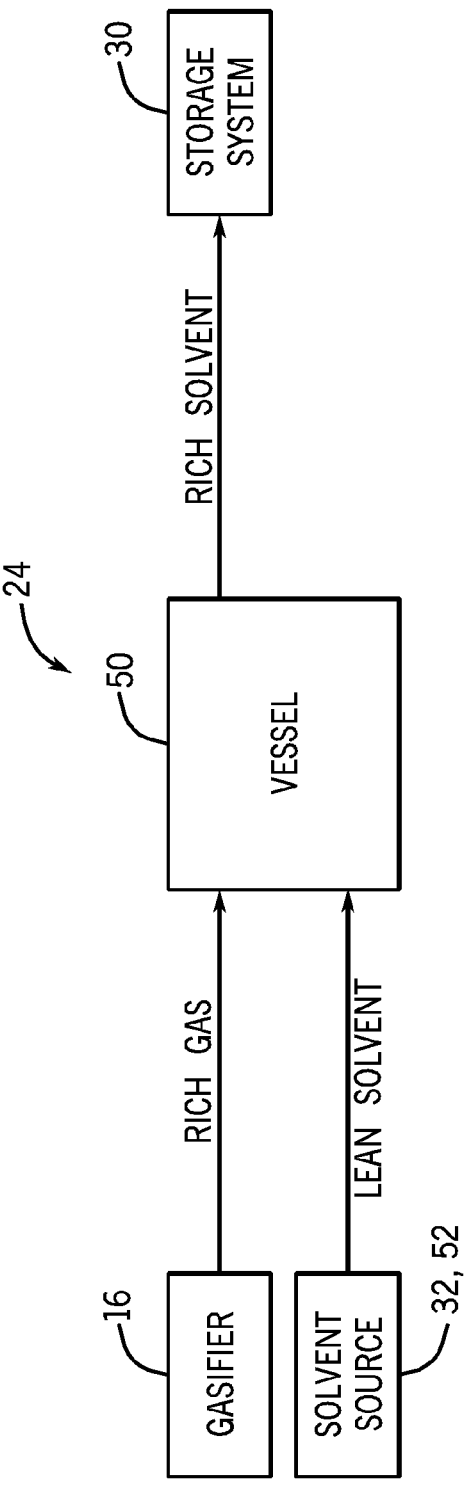
FIG. 3 is a schematic diagram of an embodiment of the capture system of FIG. 1 illustrating a solvent system to capture the emissions.

Similarly, FIG. 3 illustrates another embodiment of the capture system 24 to receive the outlet gas from the gasifier 16. As illustrated, the capture system 24 includes a vessel 50 that receives rich gas from the gasifier 16 and a lean solvent from a solvent source 52. In certain embodiments, the solvent source 52 may be the return system 32. The rich gas and the lean solvent mix within the vessel 50 for a residence time, and the mixture flows to the storage system 30. In the embodiment shown, the entire portion of the rich gas is stored within the storage system 30. Thus, the outlet gas from the gasifier 16 might not be used for preheat, and the storage system 30 may store the entirety of the combustion gases produced by the gasification train 12 during the start-up operation. Storing the entire amount of combustion gases may further reduce emissions from the gasification system 10. The capture systems 24 of FIGS. 2 and 3 are given by way of example, and are not intended to be limiting. Indeed, various embodiments of the capture system 24 may be envisioned, such as embodiments utilizing co-current absorption, membranes, cryogenics, microbial or algal systems, or any combination thereof.

Figure 4:
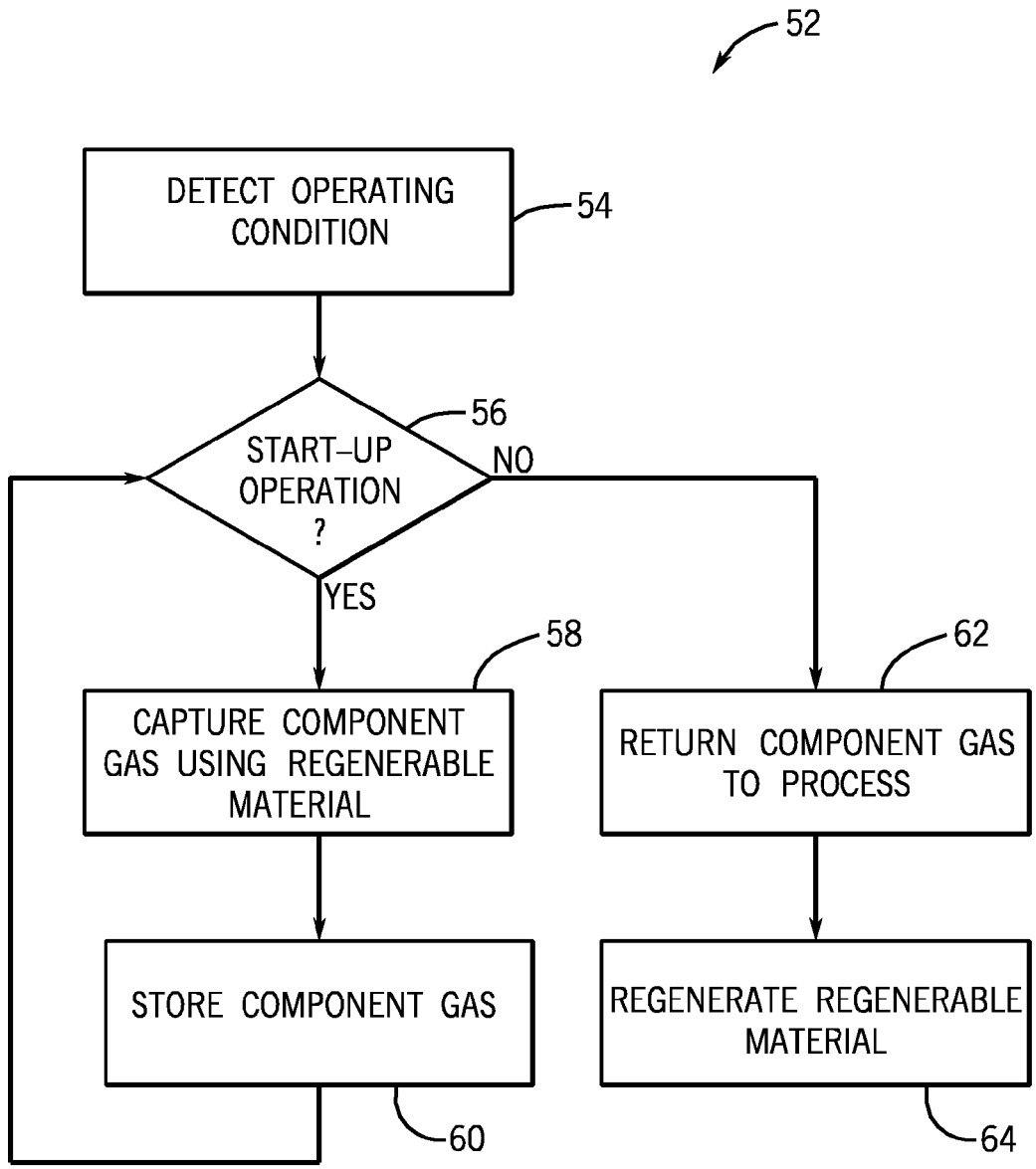
FIG. 4 is a flowchart illustrating an embodiment of a method to reduce emissions of a gasification system during start-up operation, in accordance with aspects of the present techniques.

FIG. 4 is a flowchart of an embodiment of a method 52 to reduce emissions from the gasification system 10 by selectively operating the storage train 14. The sensor 34 may detect (block 54) an operating condition of the gasifier 16. In certain embodiments, the operating condition may be a pressure, a temperature, a flow rate, a level, a gas concentration, or any combination thereof. The controller 36 may determine (block 56) if the gasification train 12 is in the start-up operation. As discussed previously, determining (block 56) the operating mode of the gasification train 12 may include comparing the operating condition to a threshold, determining if the operating condition is transient, or both. When the controller 36 has determined (block 56) that the gasification train 12 is in the start-up operation, the controller 36 may enable flow to the capture system 24. Subsequently, the capture system 24 may capture (block 58) a component gas, such as $H_2S$ and/or $CO_2$, using a regenerable material. As noted above, the regenerable material may be an absorbent, a solvent, a membrane, or any combination thereof. The capture system 24 may route the component gas to the storage system 30, which stores (block 60) the component gas. In certain embodiments, the component gas may be continuously captured (block 58) and stored (block 60) while the gasification train 12 is in the start-up operation. However, when the controller 36 has determined (block 56) that the gasification train 12 is no longer in the start-up operation, the storage system 30 may direct the component gas to the return system 32. The return system 32 returns (block 62) the component gas to the gasification train 12. Again, the component gas may be returned to various locations within the gasification train 12, such as the gasifier 16, the gas treatment system 20, or both. In addition, the return location may be based on the operating condition detected (block 54) by the sensor 34. For example, if a pressure of the gasifier 16 is low, the return system 32 may selectively return the component gas to the gas treatment system 20. The return system 32 may also regenerate (block 64) the regenerable material (i.e. used for capture 58) and direct the regenerated material back to the capture system 24 for reuse.

Figure 5:
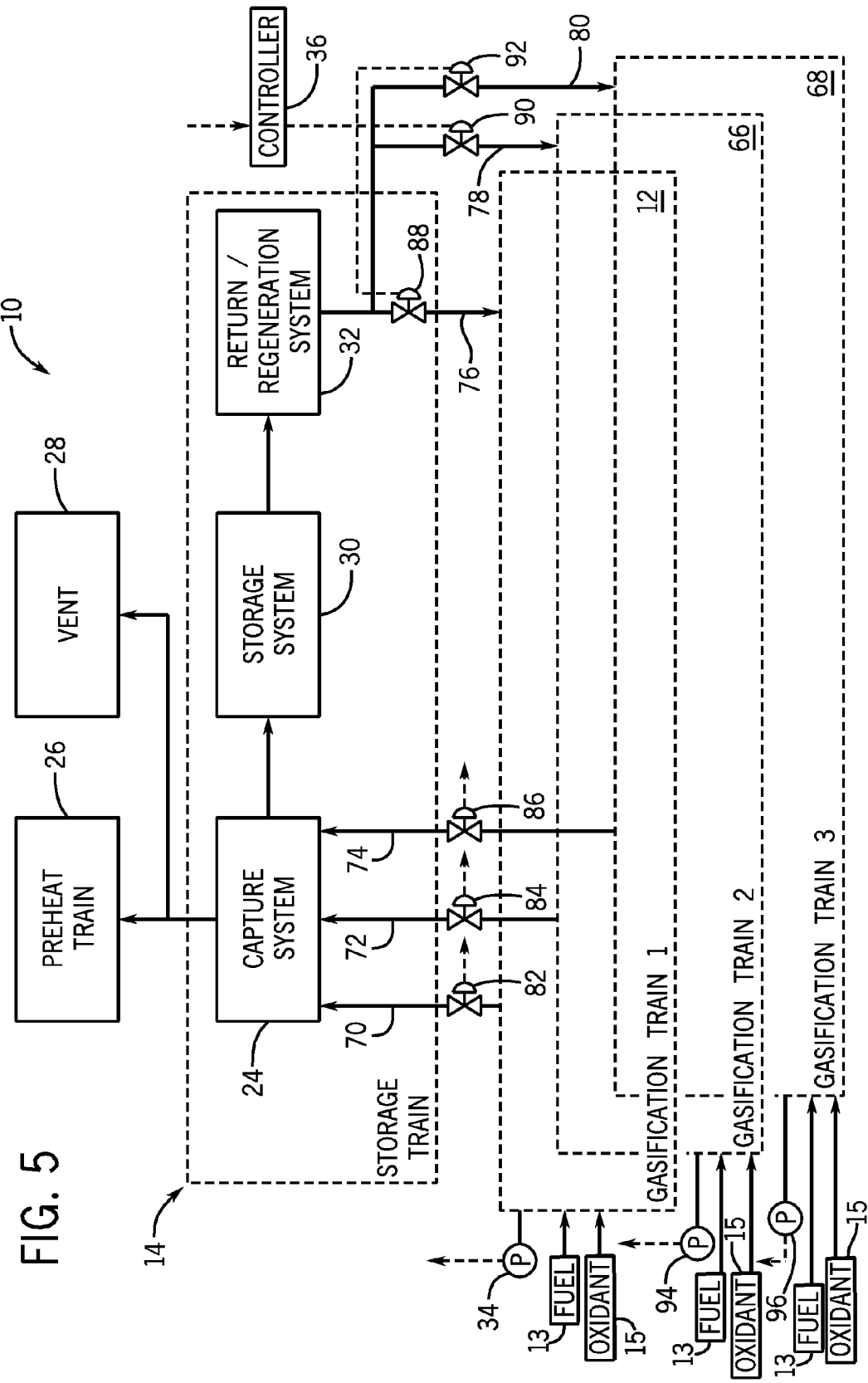
FIG. 5 is a schematic diagram of an embodiment of a gasification system illustrating multiple gasification trains coupled to a single storage train in a shared configuration.

FIG. 5 illustrates an embodiment of the gasification system 10 including multiple gasification trains 12, 66, and 68 coupled to the storage train 14 in a shared configuration. That is, each of the gasification trains 12, 66, and 68 is independently coupled to the same storage train 14. For clarity, the components of each gasification train 12, 66, and 68 have been omitted. As shown, each gasification train 12, 66, and 68 receives fuel 13 and oxidant 15 to produce combustion products or syngas. The gasification trains 12, 66, and 68 may share a single fuel source and a single oxidant source, or the gasification trains 12, 66, and 68 may receive fuel 13 and oxidant 15 from a plurality of sources. Thus, the gasification trains 12, 66, and 68 may operate independently of one another. For example, the gasification train 12 may be operating in the start-up mode and may be producing combustion products. Meanwhile, the gasification trains 66 and 68 may be operating in the normal mode and may be producing syngas. Accordingly, each of the gasification trains 12, 66, and 68 is separately coupled to the storage train 14 via piping conduits 70, 72, 74, 76, 78, and 80. In particular, the piping conduits 70, 72, and 74 couple the gasification trains 12, 66, and 68 to the capture system 24, respectively. The piping conduits 76, 78, and 80 couple the gasification trains 12, 66, and 68 to the return system 32, respectively. Control valves 82, 84, 86, 88, 90, and 92 are disposed in the piping conduits 70, 72, 74, 76, 78, and 80, respectively. Each control valve selectively enables or blocks flow between the storage train 14 and the gasification trains 12, 66, and 68. In addition, the control valves 82, 84, 86, 88, 90, and 92 may route the gases depending on the operating modes of each gasification train. For example, the gasification train 12 may be in the start-up operation, while the gasification trains 66 and 68 may be in the normal operation. The control valves 82, 84, 86, 88, 90, and 92 may enable the capture system 24 to extract component gases from the start-up gasification train 12 and to distribute the extracted component gases between the normal operation gasification trains 66 and 68. As a result, less gas is directed to the vent 28, thereby reducing the emissions from the gasification system 10.

Sensors 34, 94, and 96 are coupled to the gasification trains 12, 66, 68, respectively, to enable the controller 36 to determine the operating mode of each gasification train independently. The sensors detect operating conditions associated with their respective gasification trains. In addition, each of the sensors 34, 94, and 96 may detect one or more similar or different types of operating conditions. For example, the sensor 34 may detect a temperature of the gasification train 12, while the sensor 94 may detect a pressure of the gasification train 66. The sensors are coupled to the controller 36 and each sensor transmits its respective operating condition to the controller 36. Thus, the controller 36 may determine the operating mode of each of the gasification trains 12, 66, and 68 based on its respective operating condition, and adjust each of the control valves 82, 84, 86, 88, 90, and 92 accordingly. Although it may be desirable for multiple gasification trains to share the storage train as shown in FIG. 5, it may be desirable to implement other configurations as well.

Figure 6:
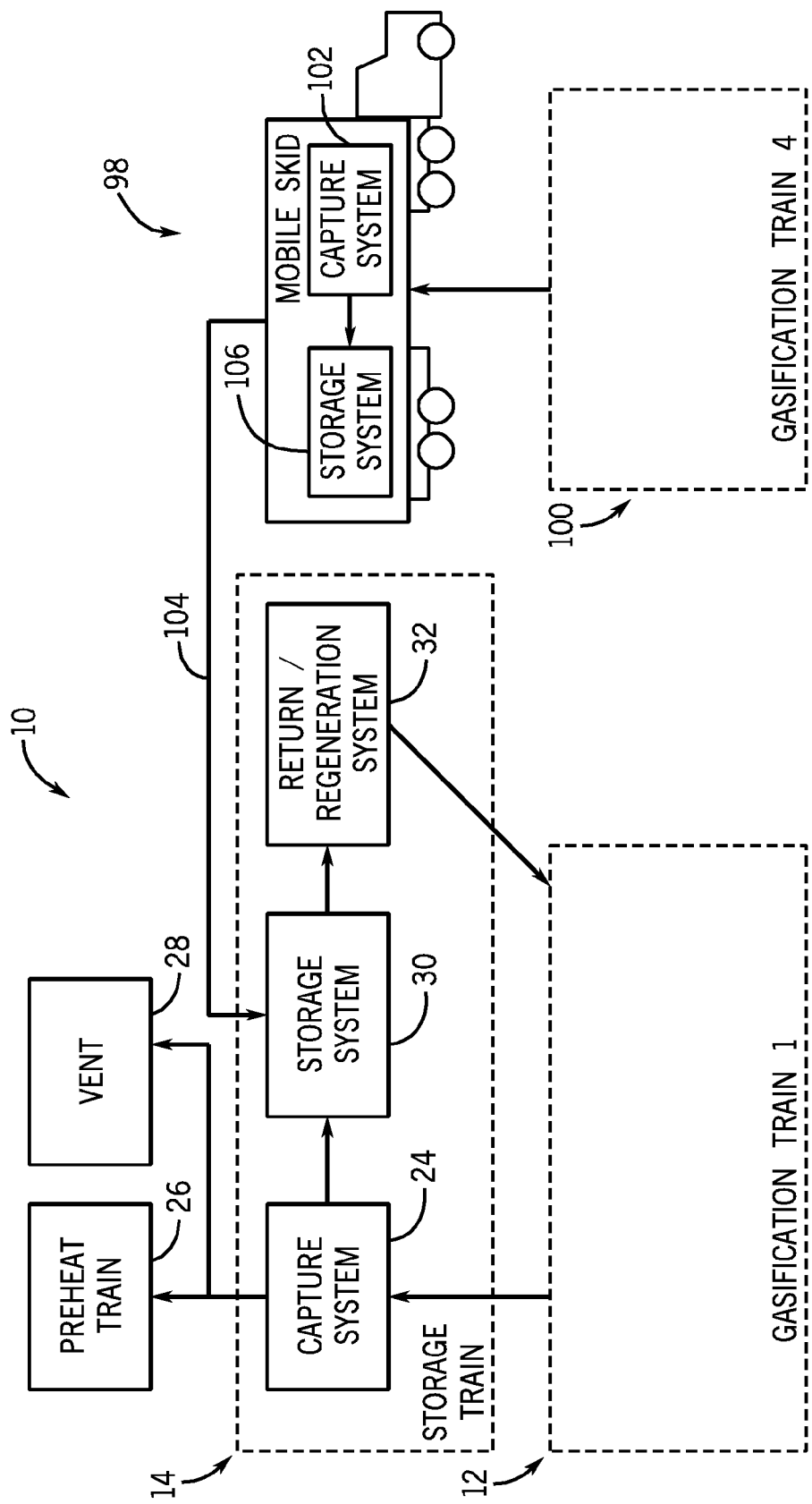
FIG. 6 is a schematic diagram of an embodiment of a gasification system illustrating a gasification train coupled to a mobile skid to reduce emissions in accordance with aspects of the present techniques.

FIG. 6 illustrates an embodiment of the gasification system 10 having a mobile skid 98 that may capture emissions in a batch process or a continuous process. The components of the gasification train 12 have been omitted for clarity. As shown, a gasification train 100 may be remote from the gasification train 12 and the storage train 14. In addition, the gasification train 100 may lack a dedicated storage train to store emissions, or the storage train may not be in operation. However, the gasification train 100 may use the storage train 14 to store emissions by employing the mobile skid 98. As illustrated, the mobile skid 98 is movable and may be selectively coupled or decoupled from the gasification train 100. For example, the mobile skid 98 may be a truck, trailer, van, train, railcar, vessel, ship, or any similar movable vehicle or container. The mobile skid 98 includes a capture system 102 that may be similar to the capture system 24 described in FIG. 1. Thus, the capture system 102 may receive an outlet gas from the gasification train 100 and may extract a component gas (e.g., $H_2S$ and/or $CO_2$) from the outlet gas. The mobile skid 98 may then transport the component gas to the storage train 14 in a continuous process, using, for example, a pipeline 104. In certain embodiments, the mobile skid 98 may include a storage system 106, which may be similar to the storage system 30 described previously. Thus, the storage system 106 may store the extracted component gas from the capture system 102. In addition, the mobile skid 98 may transport the extracted component gas in a batch process to the storage train 14. For example, the mobile skid 98 may decouple from the gasification train 100, move to a location proximal to the storage train 14, and then connect to the storage train 14. Once the mobile skid 98 has connected to the storage train 14, the extracted component gas may flow from the storage system 106 to the storage system 30. As a result, emissions from the gasification train 100 are captured and reduced.

Technical effects of embodiments of the invention include a storage train to capture and store emissions (e.g., carbon dioxide, chlorides, or sulfides) produced during start-up of a gasification train. Although gasification trains may typically include treatment systems to reduce emissions, these treatment systems may not be efficient or operable during start-up. Once the gasification train has completed the start-up sequence, the storage train returns the stored emissions to the gasification train for processing by the now-operational treatment systems. Emissions that may otherwise be released to the atmosphere during start-up are used in downstream systems after start-up, thereby reducing emissions of the gasification system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a capture system that during a start-up operation of a gasification system receives an outlet gas in a gaseous phase from the gasification system and extracts a component gas of the outlet gas using a regenerable absorbent that converts the component gas from the gaseous phase into a solid phase;
    a storage system coupled to the capture system that during the start-up operation stores the component gas extracted by the capture system in the solid phase coupled to the regenerable absorbent; and
    a return system that upon the gasification system beginning normal operation returns the component gas in the gaseous phase from the storage system to the gasification system.

2. The system of claim 1, wherein the return system is configured to regenerate the regenerable absorbent and to return the regenerable absorbent to the capture system.

3. The system of claim 1, wherein the capture system is configured to receive the outlet gas based on an operating condition of the gasification system indicating the start-up operation of the gasification system, wherein the operating condition comprises a temperature, a pressure, a flow rate, a level, or a gas concentration, or any combination thereof.

4. The system of claim 1, wherein the return system is configured to return the component gas based on an operating condition of the gasification system indicating the normal operation of the gasification system, wherein the operating condition comprises a temperature, a pressure, a flow rate, a level, or a gas concentration, or any combination thereof.

5. The system of claim 1, comprising a preheat train that during operation of the gasification system receives, from the capture system, a remaining portion of the outlet gas that remains after extraction of the component gas and preheats an integrated gasification combined cycle system with a portion of the remaining portion of the outlet gas.

6. The system of claim 1, comprising a vent that during operation of the gasification system receives, from the capture system, a remaining portion of the outlet gas that remains after extraction of the component gas and releases a portion of the remaining portion of the outlet gas to atmosphere.

7. The system of claim 1, wherein the normal operation comprises operation at steady-state operating conditions.

* * * * *